United States Patent [19]

Kobayashi et al.

[11] Patent Number: 4,648,374
[45] Date of Patent: Mar. 10, 1987

[54] AIR INTAKE SIDE SECONDARY AIR SUPPLY SYSTEM FOR AN INTERNAL COMBUSTION ENGINE

[75] Inventors: Hideo Kobayashi, Kawagoe; Norio Tomobe, Asaka, both of Japan

[73] Assignee: Honda Giken Kogyo Kabushiki Kaisha, Tokyo, Japan

[21] Appl. No.: 780,165

[22] Filed: Sep. 26, 1985

[30] Foreign Application Priority Data

Sep. 27, 1984 [JP] Japan .......................... 59-146330[U]

[51] Int. Cl.$^4$ ...................... F02M 23/08; F02M 23/10
[52] U.S. Cl. ..................................... 123/587; 123/588
[58] Field of Search .................................. 123/585–589

[56] References Cited

U.S. PATENT DOCUMENTS 4,195,602  4/1980  Yamashita et al. ................. 123/588
4,484,553 11/1984  Kobayashi et al. ................. 123/586

Primary Examiner—William A. Cuchlinski, Jr.
Attorney, Agent, or Firm—Birch, Stewart, Kolasch & Birch

[57] ABSTRACT

The so called air intake side secondary air supply system for an internal combustion engine having a choke valve in an intake air passage supplies an air intake side secondary air into the intake air passage so that the air-fuel ratio is feedback controlled. During a period of cold operation of the engine in which the choke valve is actuated to close the intake air passage, the supply of the air intake side secondary air is stopped to enrich the air-fuel ratio upon detection of a no-load operating condition of the engine such as in the case where clutch is disengaged or in the case where the shift position of the transmission is the neutral position or the parking position.

3 Claims, 3 Drawing Figures

AIR INTAKE SIDE SECONDARY AIR SUPPLY SYSTEM FOR AN INTERNAL COMBUSTION ENGINE

BACKGROUND OF THE INVENTION

1. Field of the Invention

The present invention relates to an air-fuel ratio control system for an internal combustion engine, and more specifically to the so called air intake side secondary air supply system for an internal combustion engine.

2. Description of Background Information

In an internal combustion engine provided with a three-way catalytic converter in the exhaust system, the air-fuel ratio of the mixture supplied to the engine is controlled around a stoichometric value (14.7:1 for example) by a feedback control which is performed according to the composition of the exhaust gas and operating conditions of the engine. This is because an optimum operation of the three-way catalytic converter is enabled at the stoichometric air-fuel ratio. The air intake side secondary air supply system for the feedback control is an example of this type of feedback control system and which is constructed such that an air intake side secondary air supply passage leading to downstream side of the throttle valve is provided. The air fuel ratio control is performed by varying the amount of the secondary air flowing through the air intake side secondary air supply passage.

In the air intake side secondary air supply system, it is general to stop the supply of the air intake side secondary air during an engine warm-up period after a cold start of the engine, so that the air-fuel ratio feedback control is stopped and a rich air-fuel mixture is supplied to the engine. This is because the combustion condition of the engine tends to be unstable during such an engine warm-up period. The feedback control of the air-fuel ratio starts when the warming-up of the engine is completed. Since the air-fuel ratio of the mixture supplied to the engine varies depending on the intake air temperature, it is suitable to determine the timing of the start of the air-fuel ratio feedback control using the intake air temperature. Therefore, the supply of the air intake side secondary air is stopped to enrich the air-fuel mixture when the intake air temperature is lower than a predetermined level (18° C. for example).

Further, in a system described in Japanese Utility Model Application No. 58-134919 which is assigned to the same assignee of the present application, the feedback control of the air-fuel ratio is stopped to enrich the air-fuel ratio when the engine coolant temperature is below a predetermined temperature level $T_2$ (70° C. for example) and the vehicle speed is lower than a predetermined speed $V_1$ (15 Mile/h) even though the intake air temperature is above the predetermined level $T_1$. The stopping of the air-fuel ratio feedback control during the cold engine period is determined in consideration of the closure of a choke valve of the engine and of the relatively small amount of the main intake air. Specifically, if the supply and the stop of the air intake side secondary air are repeated when the choke valve is closed so as to enrich the air-fuel ratio during the cold engine period, that will prevent the necessary enrichment of the air-fuel mixture. Moreover, since the proportion of the amount of the air intake side secondary air relative to the amount of the main intake air is high when the vehicle speed is low, the variation of the amount of the air intake side secondary air as a result of the supply and stop thereof is likely to cause hunting of the engine rotation. Thus, the driveability of the vehicle will be deteriorated if the air intake side secondary air is supplied during a period in which the engine is cold.

In this air intake side secondary air supply system, the feedback control of the air-fuel ratio with the air intake side secondary air is executed when the intake air temperature is above a predetermined temperature level $T_1$ and at the same time the vehicle speed is above the predetermined speed $V_1$, even through the engine coolant temperature is below the predetermined temperature level $T_2$. In other words, the feedback control of the air-fuel ratio is executed preferentially as the vehicle speed is high enough to avoid the hunting of the engine rotation. Specifically, under this condition, the amount of the main intake air is relatively large and the repetition of the supply and stop of the air intake side secondary air scarcely cause the hunting of the engine rotation even through the choke valve is not completely open. However, if the clutch of the vehicle is operated to disconnect the driving power of the engine under this condition, the supply and stop of the air intake side secondary air causes the hunting of the engine rotation since no load is applied to the engine. Thus, the driveability of the vehicle is deteriorated with the conventional system construction.

OBJECT AND SUMMARY OF THE INVENTION

An object of the present invention is therefore to provide an air intake side secondary air supply system in which the driveability of the vehicle is much improved especially during a period of the cold engine operation with the partially closed choke valve.

According to the present invention, the air intake side secondary air supply system is characterized in that a no-load condition of the engine during the cold operation of the engine in which the choke valve is activated to close the bore of the carburetor is detected and the supply of the air intake side secondary air is stopped upon detection of the no-load condition of the engine.

Further scope and applicability of the present invention will become apparent from the detailed description given hereinafter. However, it should be understood that the detailed description and specific example, while indicating a preferred embodiment of the invention, are given by way of illustration only, since various changes and modifications within the spirit and scope of the invention will become apparent to those skilled in the art from this detailed description.

DETAILED DESCRIPTION OF A PREFERRED EMBODIMENT

The preferred embodiment of the present invention will be described hereinafter with reference to the accompanying drawings.

Figure 1:
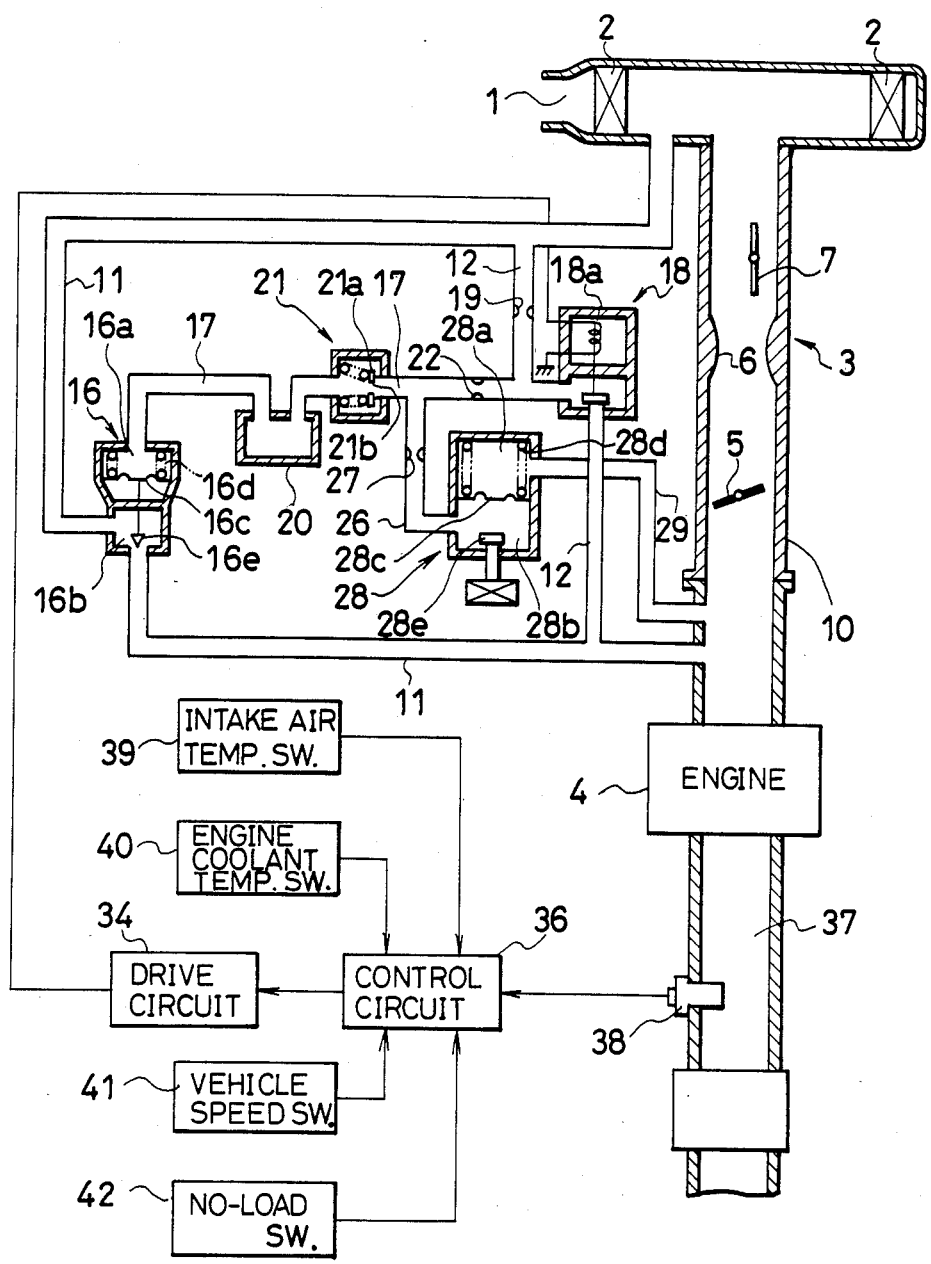
FIG. 1 is a schematic diagram illustrating the construction of an embodiment of the air intake side secondary air supply system according to the present invention.

In FIG. 1, the intake air taken at an atmospheric air inlet port 1 is drawn into an internal combustion engine 4 through an air cleaner 2, and a carburetor 3. The carburetor 3 has a throttle valve 5 and a venturi 6 formed on the upstream side of the throttle valve 5. A choke valve 7 is provided on the upstream side of the venturi 6. Intake side secondary air supply passages 11 and 12 are provided to make communication between the inside of the air cleaner 2 in the vicinity of an air outlet port, and an intake manifold 10, i.e., downstream of the throttle valve 5. The secondary air supply passage 11 is provided with an air control valve 16 which is made up of a vacuum chamber 16a, a valve chamber 16b, a diaphragm 16c, a valve spring 16d, and a valve element 16e having a tapered form. The air control valve 16 varies the sectional area of the secondary air supply passage 11 in accordance with the magnitude of a vacuum supplied to the vacuum chamber 16a, so that the area of the passage increases as the magnitude of the vacuum increases.

The air intake side secondary air supply passage 12 is provided with a solenoid valve 18 having a solenoid 18a. When the solenoid 18a is deenergized, the air intake side secondary air supply passage 12 is closed and communcation therethrough is made when the solenoid 18a is energized. An orifice 19 is provided in the air intake side secondary air supply passage 12, on the upstream side of the solenoid valve 18. In addition, the air intake side secondary air supply passages 11 and 12 may, as shown in the figure, be respectively formed as a shunt passage communicated to the intake manifold 10.

A part of the air intake side secondary air supply passage 12 between the solenoid valve 18 and the orifice 19 communicates with the pressure chamber 16a of the air control valve 16 by way of a pressure supply passage 17. The vacuum supply passage 17 is provided with a surge tank 20, a non-return valve 21, and an orifice 22, in this order, from a vacuum chamber 16a toward the air intake side secondary air supply passage 12. The non-return valve 21 is arranged so as to allow only an air flow from the air intake side secondary air supply passage 12 directed to the vacuum chamber 16a, i.e., the vacuum directed to the air intake side secondary air supply passage 12. A valve element 21a of the non return valve 21 is provided with a leak hole 21b.

On the other hand, a part of the pressure supply passage 17, between the non-return valve 21 and the orifice 22, communicates with the atmosphere through an atmospheric pressure supply passage 26 in which an orifice 27 and a vacuum responsive open/close valve 28 upstream of the orifice 27 are provided. The open/close valve 28 is made up of a vacuum chamber 28a, a valve chamber 28b, a diaphragm 28c, a valve spring 28d, and a disc-like valve element 28e. The vacuum chamber 28a communicates with the inside of the intake manifold 10 through a vacuum supply passage 29 and the open/close valve 28 is closed when the magnitude of the vacuum in the vacuum chamber 28a is smaller than a predetermined level P₁ (430 mmHg for example). On the other hand, the open/close valve 28 opens when the magnitude of the vacuum in the pressure chamber 28a becomes greater than the predetermined level P₁.

The solenoid 18a of the solenoid valve 18 is connected to a control circuit 36 through a drive circuit 34. The control circuit 36 is also provided with an output signal of an oxygen sensor 38. The oxygen sensor 38 is mounted in an exhaust manifold 37 and produces the output signal whose level $V_{O_2}$ is corresponding to an oxygen concentration of an exhaust gas and which increases as the oxygen concentration increases.

In addition to the drive circuit 34 and oxygen sensor 38, an intake air temperature switch 39, an engine coolant temperature switch 40, a vehicle speed switch 41, and a no-load switch 42 are connected to the control circuit 36. The intake air temperature switch 39 turns on when the intake air temperature $T_A$ is equal to or greater than a predetermined temperature $T_1$ (18° C. for example) and the engine coolant temperature switch 40 turns on when the engine coolant temperature $T_W$ is equal to or above a predetermined temperature $T_2$ (70° C. for example). The vehicle speed switch 41 produces when the vehicle speed V is equal to or above a predetermined speed $V_1$ (15 Mile/h for example). The no-load switch 42 consists of a switch provided on the clutch which turns on when the clutch pedal is depressed. These switches 39 through 42 respectively produce a high level output signal $V_H$ when switched on.

Figure 2:
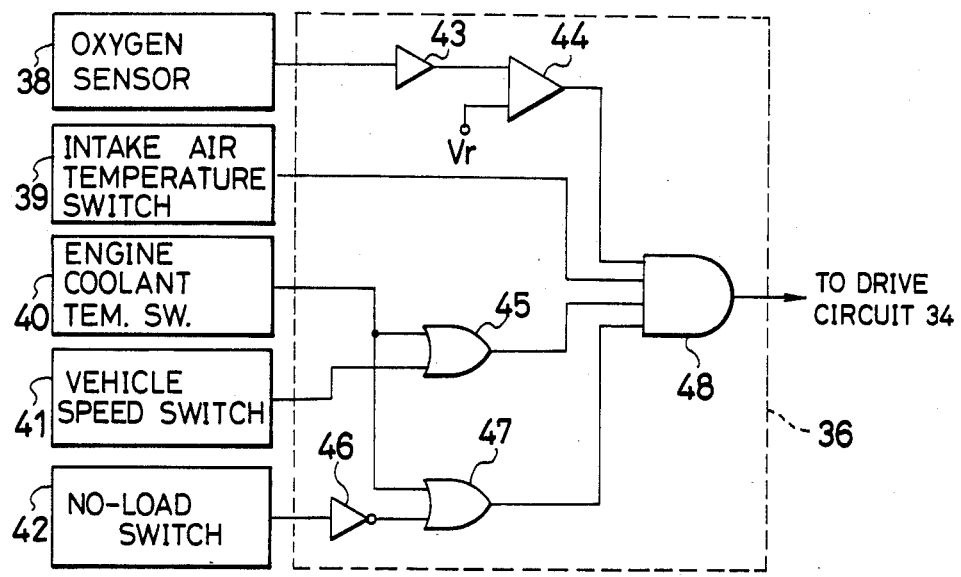
FIG. 2 is a block diagram showing the construction of the control circuit 36 of the system shown in FIG. 1.

As shown in FIG. 2, the control circuit 36 includes a comparator 44 for comparing the output signal $V_{O_2}$ of the oxygen sensor 38 supplied through a buffer 43 with a predetermined reference voltage Vr corresponding to a stoichiometric value of air-fuel ratio, an OR circuit 45 for calculating a logical sum of output signals of the engine coolant temperature switch 40 and the vehicle speed switch 41, and an inverter 46 connected to an output terminal of the no-load switch 42, an OR circuit for calculating a logical sum of output signals of the engine coolant temperature switch 40 and the inverter 46, and an AND ciruit 48 for calculating a logical product of output signals of the intake air temperature switch 39, the comparator 44 and the OR circuits 45, 47. An output signal of the AND circuit 48 is supplied to the drive circuit 34.

The operation of the thus constructed air intake side secondary air supply system of the invention will be explained hereinafter.

In the control circuit 36, if the output signal level $V_{O_2}$ of the oxygen sensor 38 is equal to or higher than the reference level Vr ($V_{O_2} \geq Vr$), it means that the air-fuel ratio is rich. In this state, the comperator 44 produces a high level output signal. Conversely, if the output signal level $V_{O_2}$ of the oxygen sensor 38 is lower than the reference voltage Vr ($V_{O_2} < Vr$), it means that the air-fuel ratio is lean. In this state, the comparator 44 produces a low level output signal. Assuming that the warming-up of the engine is already completed, the intake air temperature $T_A$ is above the predetermined temperature $T_1$. Therefore, the intake air temperature switch 39 turns on to supply a high level output signal to the AND circuit 48. Also, since the engine coolant temperature $T_W$ becomes higher than the predetermined temperature $T_2$, the engine coolent temperature switch 40 turns on to supply a high level output signal to the AND circuit 48 through the OR circuits 45 and 47. Accordingly the variation of the level of the output signal of the AND circuit 48 becomes identical with the variation of the level of the output signal of the comparator 44. Thus, when the air-fuel ratio is detected to be rich in terms of the level of the output signal of the oxygen sensor 38, the AND circuit 48 produces a high level output signal which in turn is supplied to the drive circuit 34 as a rich signal. When the air-fuel ratio is detected to be lean in terms of the output signal of the oxygen sensor 38, the AND circuit produces a low level output signal which, in turn, is supplied to the drive circuit 34 as a lean signal.

When the rich signal is applied to the drive circuit 34, the solenoid 18 is energized to open the solenoid valve 18. Thus, the communication through the air intake side secondary air supply passsage 12 is made. Conversely, when the lean signal is supplied to the drive circuit 34, the solenoid 18a of the solenoid valve 18 is deenergized to close the solenoid valve 18, which in turn, stops the communication through the air intake side secondary air supply passage 12.

On the other hand, when the opening angle of the throttle valve is relatively small under a low load operating condition of the engine such as in the "cruising" state, the magnitude of the vacuum $P_B$ in the intake manifold 10 becomes higher than a predetermined pressure value $P_1$, and the vacuum $P_B$ is in turn supplied to the vacuum chamber 28a of the open/close valve 28. As a result, the open/close valve 28 opens to provide the communication through the atmospheric pressure supply passage 26. When, on the other hand, the opening angle of the throttle valve becomes large such as in an acceleration operation, the magnitude of the vacuum $P_B$ in the intake manifold becomes lower than the predetermined pressure value $P_1$. As a result, the open/close valve 28 is closed to close the atmospheric pressure supply passage 26.

When the solenoid valve 18 is opened from the closed state during the closure of the open/close valve 28, the secondary air is introduced into the intake manifold 10 through the orifice 19 of the air intake side secondary air supply passage 12 and the solenoid valve 18. In this state, the vacuum $P_B$ in the intake maifold 10 is supplied to the vacuum chamber 16a through the solenoid valve 18 of the air intake side secondary air passage 12, the orifice 22 of the pressure supply passsage 17, a leak hole 21b of the non-return valve 21 and the surge tank 20. Since the pressure in the vacuum chamber 16a gradually increases to reach the vacuum $P_B$ due to the effect of the residual pressures in the vacuum chamber 16a, the surge tank 20, and the leak hole 21b, the opening degree of the air control valve 16, that is, the sectional area of the air intake side secondary air supply passage 11 gradually increases. Thus the amount of the air intake side secondary air increases gradually. In this way, the secondary air respectively flowing through the air intake side secondary air supply passages 11 and 12 are added together and supplied to the engine 4, to shift the air-fuel ratio to the lean side. The amount of the secondary air supplied to the engine 4 gradually increases with time. In this state, the vacuum $P_B$ is diluted by the atmospheric air flowing in the air intake side secondary air supply passage 12 from the air cleaner 2. However, the magnitude of the dilution is small due to the presence of the orifice 19.

When, on the other hand, the solenoid valve 18 is closed from the open state during the closure of the open/close valve 28, the air intake side secondary air supply passage 12 closes immediately. Therefore, the atmospheric pressure is supplied to the vacuum chamger 16a through the orifice 19 of the air intake side secondary air supply passage 12, the orifice 22 of the pressure supply passage 17, non-return valve 21, and the surge tank 20. Since the pressure in the vacuum chamber 16a rapidly approaches to the atmospheric pressure level, the opening degree of the air control valve 16, that is, the sectional area of the air intake side secondary air supply passage 11 rapidly decreases to reduce the amount of the air intake side secondary air. In other words, when the air intake side secondary air supply passage 12 is closed, the secondary air is still supplied to the engine 4 through the air intake side secondary air supply passage 11 and the amount of the secondary air decreases with time.

When the air-fuel ratio is controlled by a feedback control operation, the rich signal and the lean signal are produced alternately and without interruption irrespective of the opening and closure of the open/close valve 28. Therefore, in the air intake side secondary air supply passage 11, the amount of the secondary air increases during the presence of the rich signal, and decreases during the presence of the lean signal. Thus, the integral (I) control is performed. In the air intake side secondary air supply passage 12, the secondary air flows intermittently and the proportional control (P) takes place. Therefore, the amount of the secondary air supplied to the intake manifold becomes a sum of a proportional control part and an integral control part.

On the other hand, if the solenoid valve 18 is opened from the closed state when the open/close valve 28 is open, the secondary air is directed to the intake manifold 10 through the orifice 19 of the air intake side secondary air supply passage 12, the solenoid valve 18, the orifice 27 of the atmospheric pressure supply passage 26, and the open/close valve 28. In this state, the vacuum $P_B$ supplied to the vacuum chamber 16a through the air intake side secondary air supply passage 12 and the pressure supply passage 17 is diluted by the atmospheric air introduced through the part of the air intake side secondary air supply passage 12 on the side of the air cleaner 2 as well as the atmospheric air introduced through the atmospheric pressure supply passage 26. The degree of dilution is greater as compared with the time when the open/close valve 28 is closed. Therefore, the magnitude of the vacuum supplied to the vacuum chamber 16a of the air control valve does not reach a level at which the opening degree of the air control valve 16 increases.

When the solenoid valve 18 is closed from the open state during the open/close valve 28 is open, the air intake side secondary air supply passage closes immediately. The atmospheric air passed through the orifice 19 of the air intake side secondary air supply passage 12 and the orifice 22 of the pressure supply passage 17 and the atomspheric pressure passed through the open/close valve 28 and the orifice 27 of the atmospheric pressure supply passage 26 join together at a part of the pressure supply passage 17 between the orifice 22 and the non-return valve 21. After joining, the atmospheric pressure is supplied to the vacuum chamber 16a through the non-return valve 21 and the surge tank 20. Thus, the pressure in the vacuum chamber 16a becomes equal to the atmospheric pressure more rapidly than when the open/close valve 28 is closed. Therefore, when the open/close valve 28 is open, the air control valve 16 is closed irrespective of the opening and closing of the solenoid valve 18, and the air intake side secondary air supply passage 11 is closed.

As a result, when the open/close valve 28 is open, the air intake side secondary air is supplied only through the air intake side secondary air supply passage 12 through which the secondary air flows intermittently by the opening and closing of the solenoid valve 18. Thus, only the proportional control is performed.

In addition, during the gear shift operation or the deceleration condition of the vehicle, the vacuum $P_B$ in the intake manifold 10 becomes greater than the predetermined level $P_1$. Therefore, the vacuum in the vacuum chamber 16a leaks through the orifice 27 to the atmosphere immediately after the opening of the open/close valve 28. As a result, the speed of the decrease of the vacuum level in the vacuum chamber 16a is accelerated and the engine stall which might be caused by the delay of the decrease of the vacuum in the vacuum chamber 16a is prevented.

The operation of the system during the warm-up period after the cold start of the engine will be explained.

Firstly, if the intake air temperature $T_A$ is lower than the predetermined temperature $T_1$, the intake air temperature switch 39 is turned off and a low level signal is supplied to the and circuit 48. In this state, the AND circuit 48 provides the low level signal to the driving circuit 34 regardless of the level of the output signal of the comparator 44, that is, the output signal level of the oxygen sensor 38. The drive circuit 34 in turn stops the operation of the solenoid valve 18 as in the case in which the lean signal is applied thereto. Thus, the solenoid valve 18 remains closed. With the closed solenoid valve 18, the atmospheric pressure is continuously supplied to the vacuum chamber 16a of the air control valve 16, and the air intake side secondary air passages 11 and 12 are closed. Thus the feedback control of the air-fuel ratio is stopped to enrich the air-fuel ratio.

If, on the other hand, the engine coolant temperature $T_W$ is lower than the predetermined temperature $T_2$ and the vehicle speed V is lower than the predetermined speed $V_1$ while the intake air temperature is equal to or higher than the predetermined temperature $T_1$, both of the levels of two input signal of the OR circuit 45 become low since the engine coolant temperature switch 40 and the vehicle speed switch 41 are both turned off. Therefore, a low level signal is supplied to the AND circuit 48 from the OR circuit 45, so that the level of the output signal of the AND circuit 48 turns low. Accordingly, the air intake side secondary air supply passages 11 and 12 are closed in the same manner as in the case where the intake air temperature is lower than the predetermined temperature $T_1$. Thus, the feedback control of the air-fuel ratio is stopped to enruch the air-fuel ratio.

Nextly, if the clutch pedal is depressed to interrupt the power transmission while the engine coolant temperature $T_W$ is lower than the predetermined temperature $T_2$, the no-load switch 42 turns on. As a result, a high level signal is supplied to the inverter 46 from the no-load switch 42. In turn, a low level signal is supplied to the OR circuit 47 from the inverter 46. Since the other input signal of the OR circuit 47 from the engine coolant temperature switch 40 is also at the low level, the OR circuit 47 provides a low level signal to the AND circuit 48 which in turn produces a low level output signal. Thus, an operation which is the same as in the case where the intake air temperature $T_A$ is lower than the predetermined temperature $T_1$. Specifically, the solenoid valve 18 closes to supply the atmospheric pressure to the vacuum chamber 16a of the air control valve 16. As a result, the air intake side secondary air supply passages 11 and 12 are closed, to stop the feedback control of the air fuel ratio. Thus, the air-fuel ratio is enriched.

Figure 3:
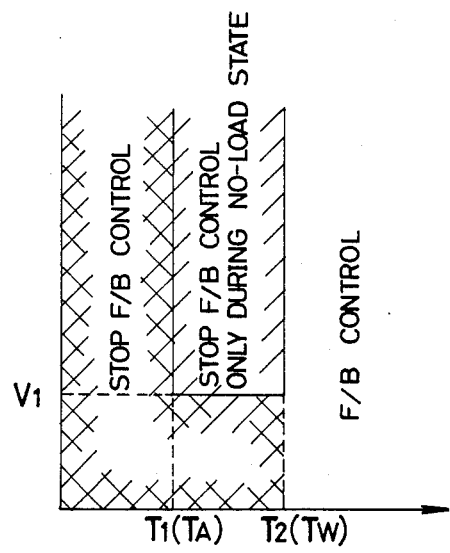
FIG. 3 is a diagram showing the operation of the system of FIG. 1.

In the thus constructed air intake side secondary air supply system, the feedback (F/B) control of the air fuel ratio is performed when the engine coolant temperature $T_W$ is equal to or above the predetermined level as illustrated in FIG. 3. When the intake air temperature TA is lower than the predetermined temperature $T_1$, or when the engine coolant temperature is lower than the predetermined temperature $T_2$ and the vehicle speed V is lower than the predetermined speed $V_1$, the feedback control of the air-fuel ratio is stopped to enrich the air-fuel ratio. When the engine coolant temperature is lower than the predetermined temperature $T_2$, the intake air temperature $T_A$ is above the predetermined temperature $T_1$, and the vehicle speed V is equal to or higher than the predetermined speed $V_1$, the feedback control of the air-fuel ratio is stopped to enrich the air-fuel ratio only in the case where the engine is operating under the no-load condition.

In the above described embodiment of the present invention, no-load condition of the engine is detected by means of the operating state of the clutch. However, the method for detecting the no-load condition is not limited to this. As an example, in the case of the vehicle with a manual transmission, the no-load condition can be detected as a state where the shift position of the manual transmission is in the neutral position. On the other hand, in the case of a vehicle with an automatic transmission, the no-load condition is detected as a state where the transmission shift position is in the parking position or in the neutral position.

Thus, according to the present invention, the supply of the air intake side secondary air is stopped to enrich the air-fuel ratio when the transmission of the engine power is interrupted during the period of cold operation of the engine such as in the state wherein the choke valve is activated. Therefore, it is possible to prevent the hunting of the engine rotation so that the driveability of the vehicle is greatly improved.

What is claimed is:

1. In an air intake side secondary air supply system for an internal combustion engine having a choke valve and a throttle valve in an intake air passage, which system is adapted to supply an air intake side secondary air into an intake air passage downstream of the throttle valve by a control valve and in response to an operating condition of the engine during a cold operation of the engine, wherein the improvement comprises means for detecting a no-load operating state of the engine during said cold operation of the engine in which the choke valve is actuated to close the intake air passage, and means for stopping a supply of the air intake side secondary air upon detection of the non-load operating state so as to enrich an air-fuel mixture supplied to the engine.

2. In an air intake side secondary air supply system for an internal combustion engine having a choke valve and a throttle valve in an intake air passage, which system is adapted to supply an air intake side secondary air into an intake air passage downstream of the throttle valve, wherein the improvement comprises means for detecting a no-load operating state of the engine during a period of cold operation of the engine in which the choke valve is actuated to close the intake air passage, and means for stopping a supply of the air intake side secondary air upon detection of the no-load operating state so as to enrich an air-fuel mixture supplied to the engine and wherein said no-load operating state of the engine is detected as a state where a clutch for transmitting an engine power is disengaged.

3. In an air intake side secondary air supply system for an internal combustion engine having a choke valve and a throttle valve in an intake air passage, which system is adapted to supply an air intake side secondary air into an intake air passage downstream of the throttle valve, wherein the improvement comprises means for detecting a no-load operating state of the engine during a period of cold operation of the engine in which the choke valve is actuated to close the intake air passage, and means for stopping a supply of the air intake side secondary air upon detection of the no-load operating state so as to enrich an air-fuel mixture supplied to the engine and wherein said no-load operating state of the engine is detected as a state where a shift position of an automatic transmission system connected to the engine is either one of a parking position and a neutral position.

* * * * *